POWDER COMPACTING PRESS

Original Filed April 23, 1965 5 Sheets-Sheet 1

INVENTOR.
PAUL VINSON

BY
Claude A. Potolicchio
ATTORNEYS

POWDER COMPACTING PRESS

Original Filed April 23, 1965

INVENTOR.
PAUL VINSON

BY
Claude A. Potlatlidis
ATTORNEYS

POWDER COMPACTING PRESS

Original Filed April 23, 1965 5 Sheets-Sheet 3

INVENTOR.
PAUL VINSON

BY
Claude A. Potochnik
ATTORNEYS

POWDER COMPACTING PRESS

Original Filed April 23, 1965 5 Sheets-Sheet 4

INVENTOR.
PAUL VINSON

BY Claude A. Potolidis

ATTORNEYS

POWDER COMPACTING PRESS

Original Filed April 23, 1965 5 Sheets-Sheet 5

INVENTOR
PAUL VINSON

BY Claude A. Petralicky
ATTORNEYS

United States Patent Office

Re. 27,958
Reissued Apr. 2, 1974

27,958

POWDER COMPACTING PRESS

Paul Vinson, Orange, Calif., assignor to Wolverine-Pentronix, Inc., Lincoln Park, Mich.

Original No. 3,415,142, dated Dec. 10, 1968, Ser. No. 618,230, Feb. 23, 1967, which is a continuation of application Ser. No. 529,735, Feb. 24, 1966, which is a continuation of application Ser. No. 450,427, Apr. 23, 1965, both now abandoned. Application for reissue Dec. 9, 1970, Ser. No. 96,677

Int. Cl. F16h *53/00*

U.S. Cl. 74—568 R 7 Claims

Matter enclosed in heavy brackets [ ] appears in the original patent but forms no part of this reissue specification; matter printed in italics indicates the additions made by reissue.

ABSTRACT OF THE DISCLOSURE

*A press for compacting powder material having a plurality of die or mold cavities and a slide or flipper assembly including a powder material hopper, an anvil, and a pick-up head positionable over the die cavities. In a first position of the flipper assembly the die cavities are filled with powder material from the hopper, in a second position of the flipper assembly the anvil is positioned over the die cavities and punches or movable die portions disposed each in a die cavity are displaced in unison to compact the powder material against the anvil and in a third position of the flipper assembly the pick-up head is disposed over the die cavities and the compacted articles are ejected into the pick-up head. The* [An automatic] powder compacting press *of the invention further has* [having] an actuating mechanism for actuating reciprocating punches, filling and ejecting mechanism and the like, such actuating mechanism comprising a cam shaft having a threaded portion and at least one cam mounted on the cam shaft and longitudinally adjustable along the threaded portion of the cam shaft, a lever actuatable by the cam and provided with an elongated cam follower having a surface disposed for engagement with the cam, the angular motion of the lever being adjustable by adjusting the cam along the threaded portion of the cam shaft.

This application is a continuation of application Ser. No. 529,735, filed Feb. 24, 1966, which in turn is a continuation of application Ser. No. 450,427, filed Apr. 23, 1965, both now abandoned.

The invention in the present application relates to a new and improved automatic powder compacting press or machine. The press is for the purpose of manufacturing cores or beads of ferrite or glass or any other powdered metal or comparable substances. The primary purpose of the machine is the manufacture of memory cores which are normally toroidal, pills, such as pharmaceutical pills, balls for ballpoint pens, porous bearings and bushings, and the like. Memory cores are of course widely used in computers and related apparatus. As stated, memory cores and porous bearings and bushings are normally toroidal, although pharmaceutical pills may be in the form of tablets, such as aspirin tablets, and balls for ball point pens are of course spherical.

Ferrite cores, by way of an example, may be from approximately .005 to .015 inch in thickness and the accuracy of the dimensions must be held to 1/10 of a thousandth of an inch. Balls for ball point pens may be in the same order of dimensions, and also require great accuracy in manufacturing. Pharmaceutical pills do not, of course, have to have comparable accuracy. In the manufacture of the ferrite cores for use in memory devices, the density of the cores must also be held accurate thereby making it necessary that the fill or the amount of powder in each die cavity of a compacting press be maintained within very close limits. The resulting density of all cores must be the same, that is, it must be uniform and accordingly, the compressing of the powdered material must be exact and repetitively constant. If these dimensional and density factors are not held within close tolerances the readout level from the cores in a memory stack would not be substantially constant from core to core and the cores would not then serve their purpose. To realize the dimensional accuracy referred to in the foregoing, it is necessary that the press be capable of accurate adjustments of movements of certain parts within at least 50-millionths of an inch. The powder is compressed by way of punches which control the fill of the die cavities and the thickness to which the cores are compressed. In a machine according to the present invention the adjustment of the movements of these parts is accurate to within a millionth of an inch. One of the primary objects of the invention is consequently to make possible this degree of accuracy of the adjustments in a powder compacting press whereby the dimensions and density of the manufactured article [is] *are* controllable with a great degree of accuracy.

A machine according to the present invention has many novel characteristics and advantages rendering it suitable for fulfilling many objectives in addition to the foregoing. An exemplary form of the machine of the invention which has been reduced to practice is capable of producing approximately eight hundred cores or pills per minute and its production rate can readily be increased to approximately sixteen hundred per minute. The machine referred to is fully automatic and discharges the finished units into separate vials or bottles. In the preferred exemplary form the machine is motor driven. The cores or pills are formed in a multi-cavity die. The cavities are automatically and accurately filled with powder; the powder is automatically pressed or compacted; the finished articles are automatically ejected from the die and are picked up, discharged and delivered into the vials or bottles.

In the preferred exemplary form of the machine the punches move upwardly in the die cavities for compacting the powder. A flipper assembly is provided which is movable transversely over the die and carries an anvil which is positionable over the die cavities. The flipper assembly also includes a secondary powder hopper in the form of a split ball which is also positionable over the die cavities for providing an overfill of powder in the cavities, the excess powder being expelled back into the hopper as will be explained hereinafter. Additionally, the flipper carries a vacuum pickup means for picking up the finished articles, i.e., cores, pills, or the like, and transferring them to a discharge station for ejection through tubes into the bottles or vials referred to above. Another primary object of the invention, consequently, is to provide an arrangement and a mode of operation for the flipper in respect to its movements for positioning the anvil, the secondary hopper and the vacuum pickup above the die cavities.

The secondary hopper is connected through a tube to a main hopper in the form of a bottle or the like containing powder to be compacted. Additionally, an object of the invention is to provide means for brushing off the surface of the anvil and to arrange for the edge surfaces of the Teflon ball forming the secondary hopper to serve as a wiper to wipe the surface of the die on each operation of the flipper.

A further object of the invention is to provide improved means for obtaining the desired accuracy in the adjustment of and movement of the punches and core rods for effecting the fill of the die cavities and compacting the powder. Another object is to realize an accuracy of the order of one-millionth of an inch in these adjustments by way of cams axially adjustable upon a threaded shaft and cooperating with the surface of a cone forming part of a lever mechanism actuatable by the cams and which in turn actuates the parts of a tool capsule which holds the punches and core rods.

An additional object is to provide for accuracy of operation and maintenance of the desired accuracy in applications where toroidal articles are produced by providing punches in the form of sleeves having central bores with core rods operating in the bores. A further object is to realize the desired accuracy by providing tool holders for the punches and core rods having circularly arranged radial slots for these elements allowing them to float radially, but to be contained axially or vertically and by utilizing the internal surface of the die cavities or bores for positioning the punches and the internal surface of the bores in the punches for in turn positioning the core rods. Another object is to provide an accurate adjustment of the strokes and operational positions of the core rod holder and punch holder.

Further objects and additional advantages of the invention will become apparent from the following detailed description when read in conjunction with the attached drawings wherein.

GENERAL ORGANIZATION OF THE MACHINE

The general organization of the illustrated exemplary embodiment of a machine according to the invention will be described first and the various parts and components will subsequently be described in detail, proceeding from the input drive end to the tool holding capsule [die] and flipper actuation *end*.

Figure 1:
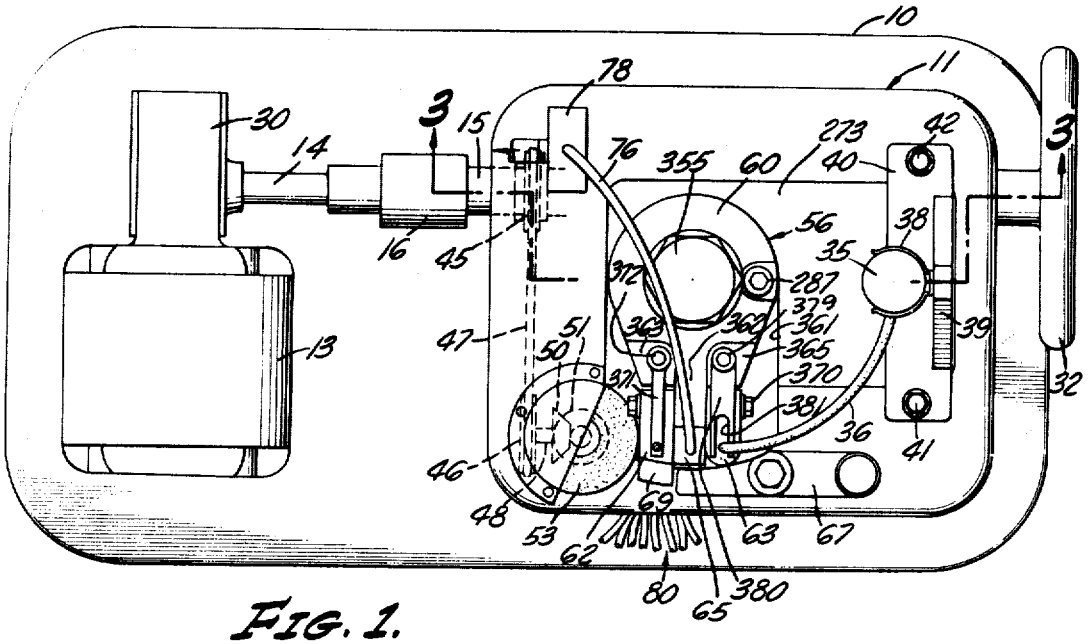
FIGURE 1 is a plan view of an example of a preferred embodiment of the invention.
Figure 2:
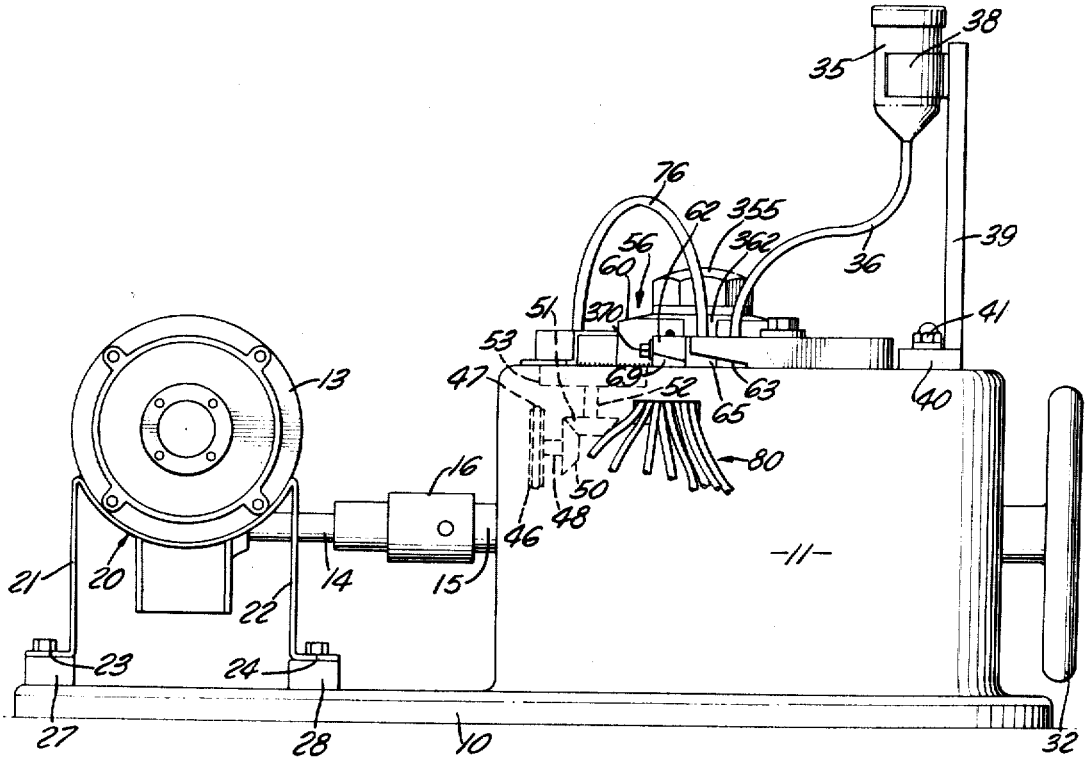
FIGURE 2 is a side elevational view thereof.

Referring to FIGURES 1 and 2 of the drawings, a preferred exemplary embodiment of a machine according to the invention comprises a substantially rectangular base 10 on which the machine is mounted, and a housing 11 enclosing various components of the machine as will be hereinafter described. A variable speed electric motor 13 is provided with an output shaft 14 for driving a shaft 15 through a coupling 16 for furnishing the power means for effecting the filling, pressing, ejecting and vacuum pickup operations of the machine. The motor 13 is mounted in a saddle 20 having upright legs 21 and 22 with feet 23 and 24 mounted on spacers 27 and 28 on the base 10 of the machine. Numeral 30 designates a housing forming a part of the motor 13 which contains a reduction gear train through which the shaft 15 is driven.

On one end of the shaft 15, at the opposite end of the housing 11, is a hand wheel 32 by means of which the shaft 15 can be rotated by hand.

A primary hopper 35 in the form of a funnel or a bottle contains the powder to be compacted into finished articles. From the bottom of the primary hopper leads a flexible tube 36 which connects to the secondary hopper which operates to fill the die cavities, as will be described hereinafter. The primary hopper 35 is supported in a flexible clamp 38 attached to the upper end of an upright 39 having a base 40 attached to the top of housing 11 by bolts, as shown at 41 and 42.

Within the housing 11, and shown in broken lines in FIGURE 1 there is a pulley 45 keyed on the shaft 15. This pulley drives another pulley 46 by means of a belt 47. The pulley 46 is in turn keyed on a shaft 48 suitably mounted and journaled within the housing 11. Mounted on the shaft 48 there is a bevel gear 50 which meshes with another bevel gear 51 keyed on a shaft 52 which drives a rotary brush 53. The bristles of the brush 53 extend upwardly and the brush is positioned adjacent to [the] *a slide or* flipper assembly, designated generally at 56, which is mounted on top of the housing 11. The flipper assembly will be described in detail hereinafter and for the present, it is sufficient to indicate that it is positionable over the die having the die cavities in which the powder is compacted. The position of the flipper assembly 56 may be observed in the cross-sectional views of FIGURES 3 and 5, the die being shown generally at 58 in FIGURE 5.

Referring again to FIGURES 1 and 2, the *slide or* flipper assembly can be seen to include a body member 60 rotatable in a horizontal plane, pivotally supporting anvil holding member 62 and a support member or arm 63 for the secondary hopper. Between these members is disposed the vacuum pickup member or head 65. The anvil holder member 62 carries an anvil 335 (best seen in FIGURES 10 and 12) and the anvil may be moved over brush 53 so that any powder adhering to the anvil is brushed off.

Numeral 67 designates an arm member which cooperates with a cam surface 69 at the end of the anvil holder 62 for extending the anvil toward the die cavities as will be explained hereinafter in further details.

The vacuum pickup 65 is connected by means of a flexible tube 76 to a controlled source of vacuum, which may be of any suitable type, as designated by numeral 78. The finished articles, after having been pressed from the powder and ejected, are picked up by the vacuum pickup 65 and are released over a member having a group of holes arranged in a circle, corresponding to the cavities or bores in the die 58 as will be described in further details hereinafter. The compacted finished articles, whether toroidal cores, tablets, or balls, when released drop into these holes to which are connected a plurality of tubes as shown at 80 which lead to and into separate individual vials or bottles into which the finished articles are delivered.

Figure 3:
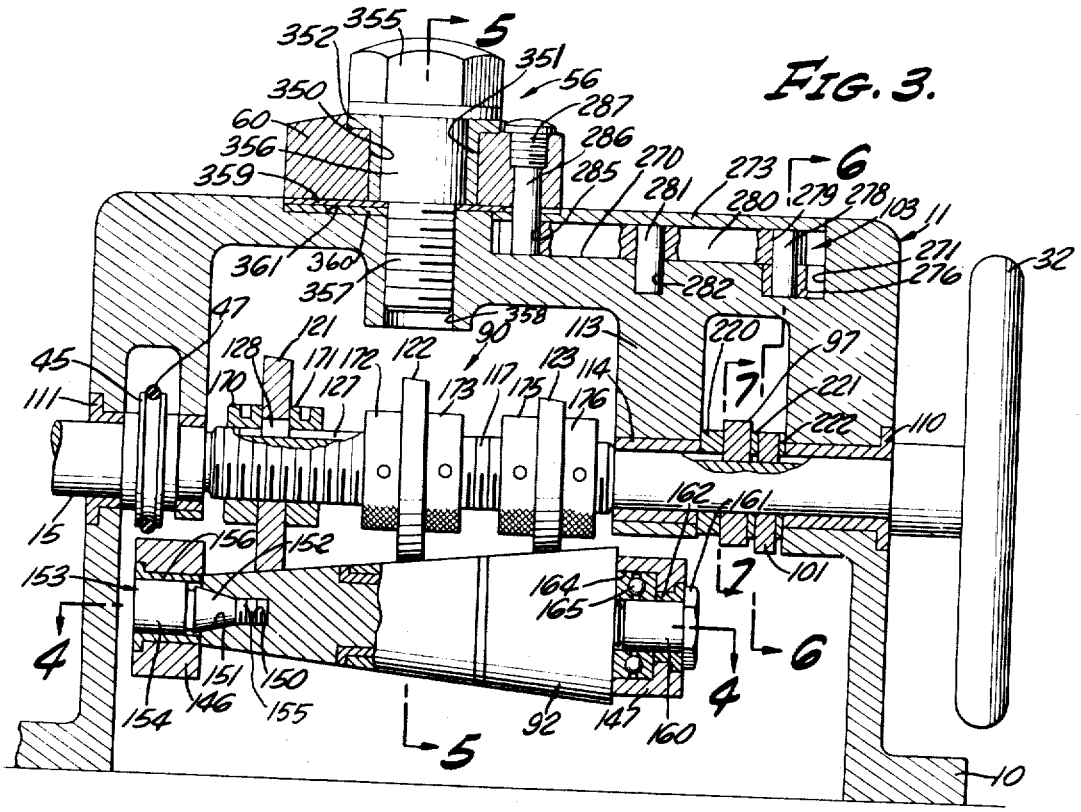
FIGURE 3 is a sectional view thereof taken substantially along line 3—3 of FIGURE 1.
Figure 4:
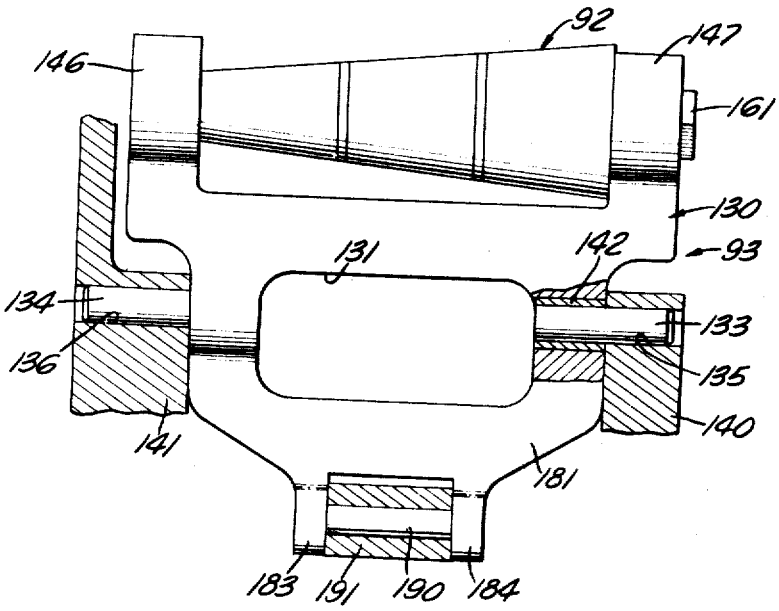
FIGURE 4 is a sectional view of a portion thereof taken along line 4—4 of FIGURE 3.
Figure 5:
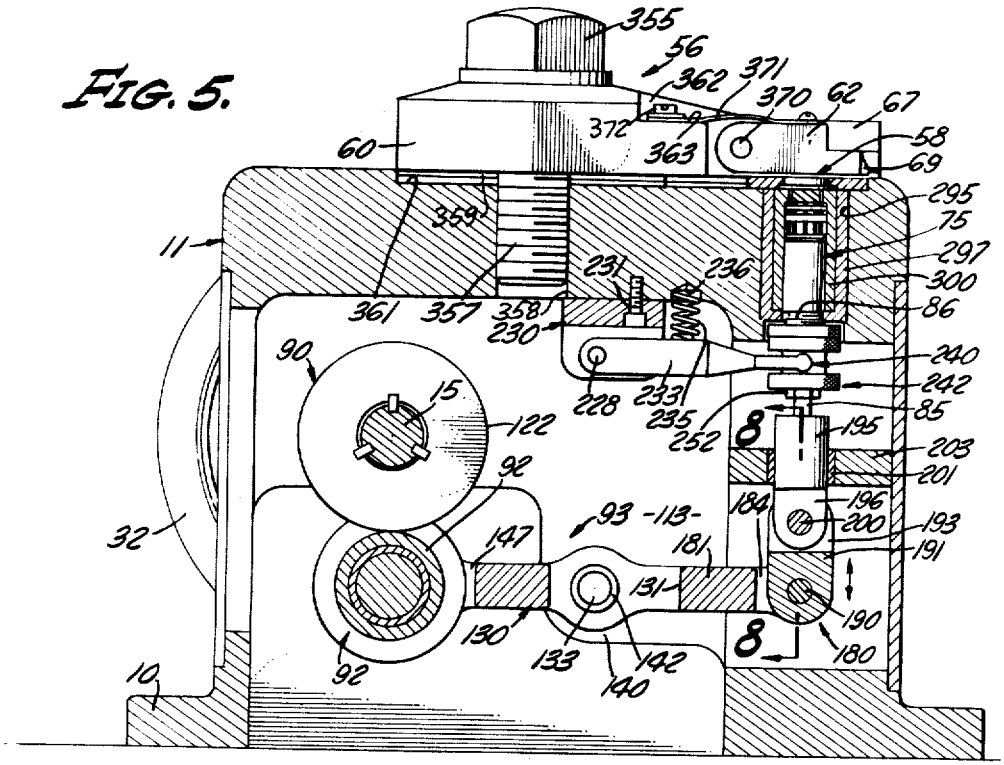
FIGURE 5 is a sectional view thereof taken along line 5—5 of FIGURE 3.

Referring now to FIGURES 3, 4, and 5, it can be seen that a tooling capsule 75, best seen in FIGURE 5, comprises a rod or stem 85 which carries the punches, and a sleeve 86 which carries the core rods. The rod stem 85 is actuatable by an assembly of cams designated generally at 90 and disposed on the cam shaft 15. These cams operate a cone 92 forming part of a lever assembly designated generally at 93. The sleeve 86, carrying the core rods, is actuatable by a separate cam designated at 97 (see FIGURE 7) which actuates a lever assembly designated generally at 98.

Figure 6:
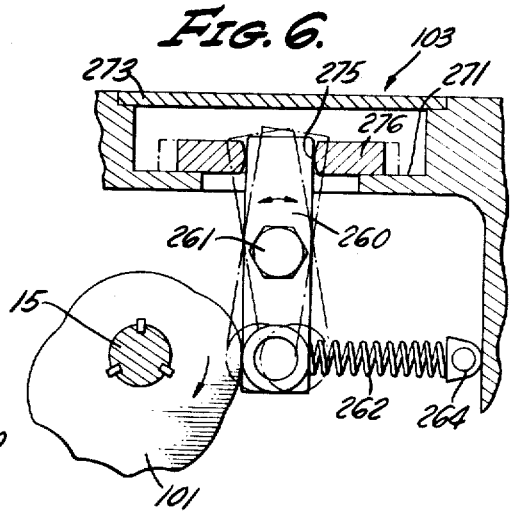
FIGURE 6 is a sectional view of a portion thereof taken along the line 6—6 of FIGURE 3.

As seen in FIGURE 6, the *slide or* flipper assembly 56 is actuated by a separate cam designated at 101 which actuates a lever and slide assembly designated generally at 103 in FIGURE 6.

DETAILED DESCRIPTION OF THE MACHINE

Actuation of the tooling capsule

Figure 15:
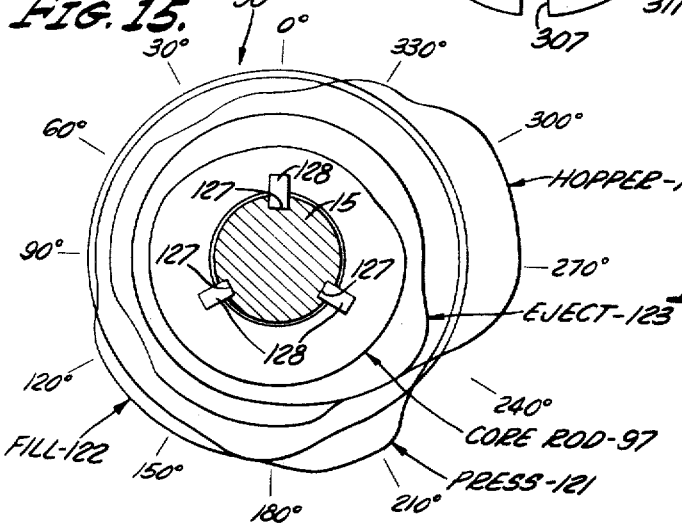
FIGURE 15 is an axial view of the cam shaft showing the contours of all the cams.

As explained in the foregoing, the machine provides for a very accurate adjustment of the positioning of the parts constituting the tooling capsule in order to accurately adjust the fill of the cavities in the die and the pressing of the powder, i.e., the thickness to which the power is pressed or compacted. The actuating mechanism for these parts, as shown in detail in FIGURES 3 to 8, is driven by the shaft 15 extending transversely through the housing 11, as best seen in FIGURE 3, being journaled therein by means of bushings 110 and 111 fitting appropriate bores disposed in the walls of the housing 11. The housing 11 has a downwardly extending internal web 113 having a bore within which is a bushing 114 in which the shaft 15 is additionally journaled. The shaft 15 is threaded with a 40 pitch micrometer thread as designated at 117. On the shaft are mounted three cams, as designated at 121, 122, and 123, which constitute respectively the press cam, the fill cam and the eject cam. As shown in FIGURE 15 which is an end view in section of the shaft 15 enabling the cam contours to be observed, the shaft 15 has key ways such as shown at 127, and the cams are keyed to the shaft by keys 128 so that they can slide along it axially but are positively driven rotationally by shaft 15. The peripheries of the cams are beveled as shown in FIGURE 3, and the peripheral surfaces of the cams engage with a tapered cone 92 forming part of the lever actuating mechanism for the rod or stem 85 of the tooling capsule. The lever actuating assembly 93, as shown in FIGURES 4 and 5, comprises a lever in the form of a frame, as generally designated at 130. This frame-like lever has an opening 131 and is provided with extending stems or trunnions 133 and 134 received and journaled in bores 135 and 136 formed in integral web portions of the housing 11, as designated at 140 and 141. A bushing 142 is disposed in an appropriate bore in a portion of the frame-like lever 130 for supporting the stem or trunnion 133. The frame-like lever 130 is further provided with integral bifurcated legs 146 and 147 forming a yoke affording a journaled support for both ends of the cone 92 rotatably mounted between the legs. The axis of the cone 92 is parallel to the axis of the shaft 15, and its periphery has a taper which for example may be of the order of one degree.

The cone 92 (FIGURE 3) has a threaded bore 150 in its left end, as seen in the drawing, and a tapered counterbore 151. Fitting therein is the threaded end portion 155 of an arbor 153 having a tapered portion 152 and a cylindrical portion 154 journaled in a bushing 156 in a bore in the leg 146. At the other end of the cone 92 there is an arbor 160 having a hexagonal head 161. The arbor extends into the end of the cone 92 and through a bushing 162 in a bore in the end of the leg 147 of frame-like lever 130. This leg also has a counterbore 164 housing a bearing 165 through which the arbor 160 extends. The mountings for the cone 92 are such that it is freely rotatable when engaged by one of the rotating cams 121, 122, or 123.

Disposed adjacent to each of the cams, 121, 122 and 123 for holding them in position are knurled nuts, designated 170 and 171 for cam 121, 172 and 173 for cam 122, and 175 and 176 for cam 123. These knurled nuts thread upon thread 117 on cam shaft 15 and are provided with circumferentially arranged spaced radial holes or bores whereby they may radially be rotated small angular amounts. By means of rotating these nuts the cams may be adjustably displaced axially along the cam shaft 15 whereby precise adjustments of the tooling are realized as will be described more in detail presently.

Figure 8:
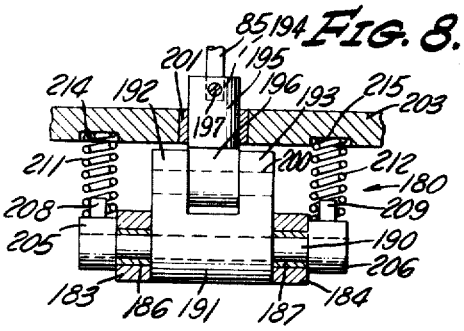
FIGURE 8 is a sectional view of a portion thereof taken along line 8—8 of FIGURE 5.

The lever member 130 of the lever actuating assembly 93 is connected to the actuating stem 85 of the punch holding member of the tooling capsule 75 by way of a knuckle joint shown generally at 180 in FIGURES 5 and 8. The lever member 130 has an end portion 181 provided with extending legs 183 and 184 forming a yoke. These legs, as best seen in FIGURE 8, have bores in them in which are bushings 186 and 187 and disposed transversely through these bushings is a pin 190. Journaled on this shaft is a knuckle joint member 191 having projecting legs 192 and 193 forming a yoke. A connecting rod or member 195 is connected to the stem 85 by having on its upper end an axial bore 194 receiving the lower end of stem 85 immobilized therein by means such as set screw 197. The other end 196 of connecting rod 195 is positioned between legs 192 and 193 of knuckle joint member 191, these parts being connected by a shaft or pin 200 passing through appropriately aligned bores in the legs and in end 196 of the connecting rod. The connecting rod 195 is guided by a bushing 201 in a bore in a transverse web 203 formed within the housing 11.

On the ends of the pin 190 are collars 205 and 206 having radial projecting pins 208 and 209 which fit into the ends of coil springs 211 and 212, the other ends of which are received in recesses 214 and 215 in the supporting web 203. Consequently, when the right end of lever 130, as seen in FIGURE 5, moves upwardly the springs 211 and 212 are compressed and serve to stabilize and regulate the lever operation and the movement of the actuating rod or stem 85.

As will be described presently, the stem 85 moves the punches that control the filling and pressing of the powder. Extreme accuracy of positioning the punches for filling the die cavities is required and extreme accuracy in the pressing movement of the punches for compacting the powder is necessary in order that the finished articles be pressed or compacted to the required thickness. These adjustments are realized by adjusting the cams 121 and 122 and 123 along the threaded shaft 15. Detailed description of these adjustments will be given after the tooling capsule has been described in detail.

Figure 9:
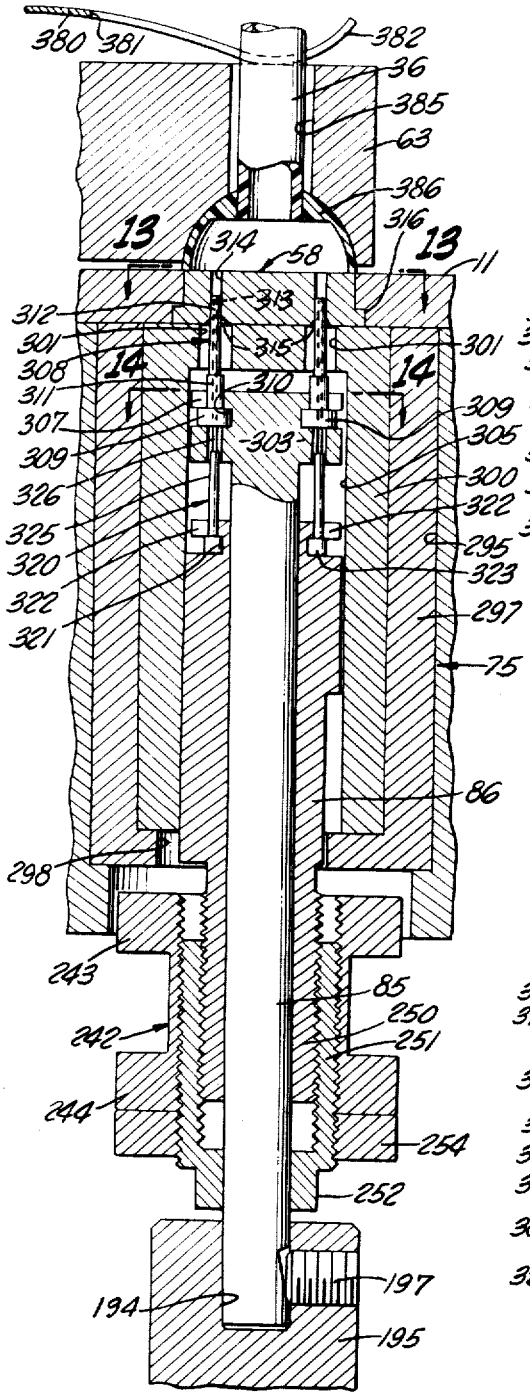
FIGURE 9 is an enlarged sectional view of the tooling capsule of the example of a preferred embodiment of the invention shown in the die cavity fill position.

The sleeve 86 as shown in FIGURES 5 and 9 carries the core rods which fit in axial bores in the punches as will be described presently. This sleeve is actuated by a separate cam which is the cam 97 shown in FIGURES 3, 7, and 15.

Figure 7:
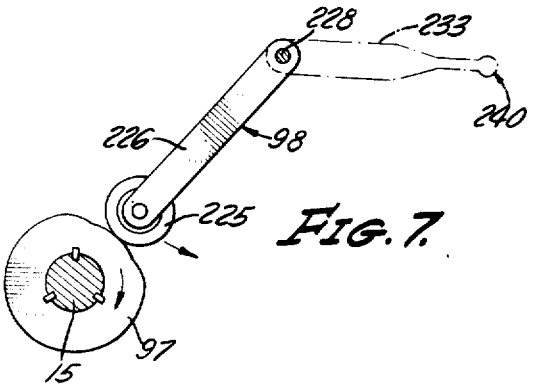
FIGURE 7 is a sectional view of a portion thereof taken along line 7—7 of FIGURE 3.

Between the cam 97, as shown in FIGURE 3, and the web 113 is a bushing 220. Between the cam 97 and cam 101 is a washer 221, and on the opposite side of the cam 101 is another washer 222. As shown in FIGURE 7, a roller cam follower 225 which engages the cam 97 is mounted on the end of an arm 226 attached to a transverse pivot pin 228. As shown in FIGURE 5, a support bracket 230 attached inside of the housing 11 by screws such as shown at 231, is provided with a bore in which the transverse pivot pin 228 is journaled. Bracket 230 is substantially in the form of a yoke and it also supports, mounted on the pivot pin 228 between the legs of the yoke, an actuating lever arm 233 acting against a coil spring 235, the other end of which is received in a recess 236 formed below the top of the housing 11. The end of the lever 233 is bifurcated so as to form a yoke designated generally by numeral 240. The yoke 240 engages the barrel part of a nut or threaded collar 242 having knurled flanges 243 and 244 as may best be seen in the enlarged view of FIGURE 9. The sleeve 86 of the tooling capsule 75 is threaded at its lower end 250. Threaded onto this end 250 is an internally and externally threaded sleeve 251 having a nut head 252 formed at its lower end. The threaded collar 242 is threaded onto the external threads on the sleeve 251 and its position thereon may be set by a lock nut 254.

As may be seen, the assembly just described provides for a fine relative adjustment of the position of the sleeve 86 that actuates the core rods relative to the position of the actutaing lever mechanism 98 including the lever arm 233 and the yoke 240 at the end thereof. The internal and external threads of the sleeve 251 are of different pitch. Therefore, by adjusting the nut head 252 and sleeve 251 to move it in one direction while adjusting the threaded collar 242 to move it in the opposite direction a very fine precision adjustment can be made in the vertical position of the actuating sleeve 86, controlling in turn position of the core rods, relative to the actuating mechanism and cam 97. Or stating it another way, the instantaneous position of the core rods can be very precisely adjusted for any position in which the cam 97 is in at a given time.

Tooling capsule

Figure 10:
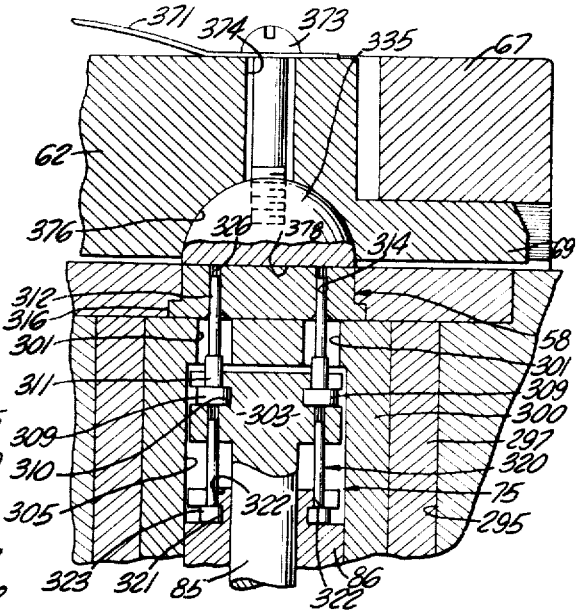
FIGURE 10 is a partially enlarged sectional view of the tooling capsule shown in the press position.
Figure 11:
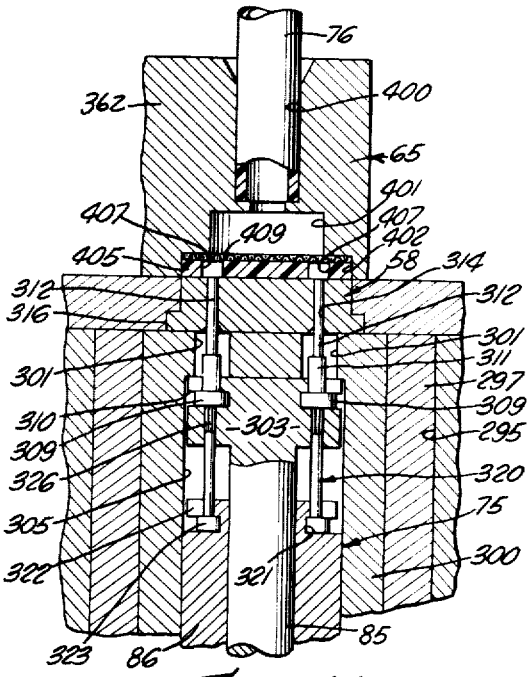
FIGURE 11 is a partial enlarged sectional view of the tooling capsule shown in the eject position.
Figure 13:
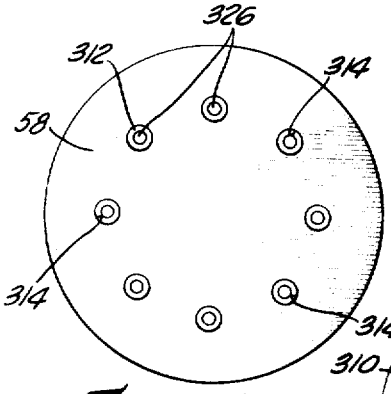
FIGURE 13 is a plan view of the die as seen from line 13—13 of FIGURE 9.
Figure 14:
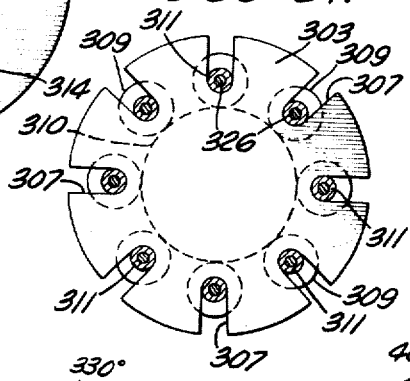
FIGURE 14 is a view of the top of the tool holding capsule as seen from line 14—14 of FIGURE 9.

The tooling capsule 75 is best seen fully in cross-section in FIGURE 9 and portions thereof are shown in FIGURES 10 and 11, and also in FIGURES 13 and 14. Referring now more particularly to FIGURES 9, 10 and 11, the body of the housing 11 has a bore 295 in which it receives the tooling capsule and the tool holders. Within the bore 295 is a cylindrical member 297 having a bore 298 in its bottom. A second cylindrical member 300 is disposed within the cylindrical member 297. The cylindrical member 300 is open at its bottom end and has an upper closed end provided with a group of eight bores or openings 301 to accommodate the punches, *or movable die portions* shown at 308, which reciprocably move through these bores. The punches 308 are carried in a tool holder in the form of an integral enlarged head 303 at the end of the rod or stem 85. The head 303 is adapted to reciprocably move in the inside, or bore 305, of the cylindrical member 300. The head 303 has eight angularly spaced radial slots 307 best seen in FIGURE 14. There are eight punches *or movable die portions* 308 corresponding to the number of slots 307 in the head 303. Each punch *or movable die portion* has an enlarged circular head as shown at 309 in FIGURES 9 and 14 of a thickness to be received in an annular groove 310 in head 303. Each punch *or movable die portion* has a part of decreased diameter 311, of a size to be received in one of the radial slots 307, and an upper portion 312 of still decreased diameter which performs the [punching] *compacting* operation. This portion 312 of each punch is of a size to fit snugly into one of the *molding* cavities or bores 314 in the die *or mold* 58. In the example of the invention as shown, there are eight punches corresponding to the number of cavities or bores 312 in die 58, as best seen in FIG. 13. The die *or mold* 58 is circular and may be made of suitable material for this purpose such as hardened tool steel or tungsten carbide which may be substantially the same as the material of the punches. The entrances to the die cavities or bores 314 are slightly chamfered or radiused as showed at 315. At the bottom of the die *or mold* there is an extending integral flange or shoulder 316 and the die as a whole fits into a corresponding bore and counterbore as shown in the top wall portion of the housing 11.

Each of the punches *or movable die portions* 308 is provided with a longitudinal bore 313 of a size to snugly receive a core rod, *or pin* designated generally at 320. The upper end of the sleeve 86 forms a tool holder within the tooling capsule for the core rods by being provided with an annular groove 321 and a group of eight angularly spaced radial slots designated generally at 322, corresponding to the slots in the head 303 of rod or stem 85.

The core rods *or pins* 320 are provided with enlarged heads 323 which are received in the annular groove 321 and with reduced diameter cylindrical portions 325 which are held in slots 322. The core rods are further provided with integral further reduced diameter portions 326 adapted to extend upwardly through the bores 313 in the upper portions 312 of the punches 308. This construction can be observed more clearly in the enlarged views of FIGURES 16, 17 and 18.

From the foregoing those skilled in the art will observe that both the punches and core rods are free to float radially in their tool holders, but they are contained axially. The punches are guided axially by the internal diameter of the *molding* cavities or bores 314 in the die *or mold* 58. The core rods 326 are guided by the internal diameter of the bores in the upper parts 312 of the punches *or movable die portions* 308. This manner of holding and mounting the tools whereby radial float is permitted and the tools are contained axially as described makes it possible to realize the degree of accuracy which is necessary in the adjustments and movements as has been described in the foregoing. The fits respectively between the outer diameter of the punches 308 and the inner diameter of the bores 314 of the die cavities and between the outer diameter of the core rod ends 326 and the inner diameter of the bores 313 in the punches are effected within close tolerances and with great precision.

The consecutive operations effected by the tooling capsule and the respective positions of the punches and core rods while effecting such operations are illustrated in FIGURES 9, 10 and 11 showing respectively the fill, press and eject positions of the tool holders and tools in the tooling capsule 75. As will be observed in FIGURE 9 and the enlarged view of FIGURE 16, the punches *or movable die portions* 308 and core rods 326 have been retracted for puroses of filling the die *molding* cavities or bores 314. The position to which the punches are retracted is determined with extreme accuracy by prior adjustment as will be described hereinafter.

Figure 17:
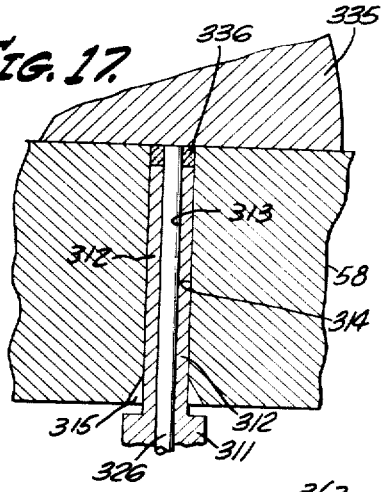
FIGURE 17 is an enlarged partial sectional view of a detail similar to FIGURE 16, but illustrating the press operation.

FIGURE 10 and the enlarged view of FIGURE 17 illustrate the press position. In this position the bottom face 378 of the anvil 335 is positioned over the die 58. The ends 326 of the core rods have been moved upwardly against the bottom face 378 of the anvil 335 and the punch end portions 312 have moved up to compact or press the powder in each die cavity 314 into a toroidal shaped article as designated at 336 in FIGURE 17.

Figure 18:
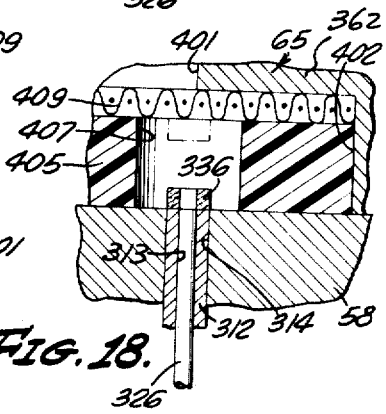
FIGURE 18 is an enlarged partial sectional view showing the eject operation with the vacuum pickup in position.

FIGURES 11 and 18 show the eject position wherein the punch end portions 312 have been moved up with their ends substantially level with the ends of each die cavity 314 for ejecting the finished articles 336 from the die cavities. In this eject position, the vacuum pickup head or member 65 is over the die 58 in a position to pick up the compacted articles 336 for transfer to a discharge station as will be explained hereinafter in further details relative to the descripiton of the flipper assembly and its operation.

The actuation of the flipper assembly

The flipper *or slide* assembly designated generally by numeral 56, is actuated from cam 101 (FIGURE 3) having a contour as shown in FIGURES 6 and 15. The cam 101, as best seen in FIGURE 6, actuates a lever member 260 which is in the form of a cam follower mounted on a pivot bolt 261 within the housing 11. The lower end of the cam follower member 260 acts against a coil spring 262 the end of which engages a spring holder 264 which abuts against a sidewall of the housing 11.

As shown in FIGURE 3, in the top plate of the housing 11 is provided a recess 270 having a bottom surface. Recess 270 is in turn provided with a transversely disposed lower recess 271. These recesses are covered by a cover plate 273. The end of the cam follower member 260 engages in an opening 275 in a slide member 276 that slides in the transverse lower recess 271. The slide member 276 has an extending pin 278 (FIGURE 3) that engages in a bore 279 in the end of a lever 280 pivoted at an intermediae point by way of a pivot pin 281 extending into a bore 282 in the bottom of the recess 270. In the other end of the lever member 280 is a bore 285 which receives a pin 286 the upper end of which is threaded at head 287 for affixing radially to a side part of portion of the flipper member 60. As may be observed, the actuating effect of the cam 101 is to operate the lever 260 which by way of the slide 276 and lever 280 rotates the flipper member 60 angularly through its various positions as shown in FIGURES 9, 10, 11 and 12. The details of the flipper assembly will be described hereinafter.

The flipper assembly

The flipper *or slide* assembly may be seen in FIGURES 1, 2, 3, and 5 and parts of it in FIGURES 9, 10, and 11 and in the enlarged views of FIGURES 12, 16, and 17 and 18. As best seen in FIGURES 3 and 5, the flipper *or slide* body 60 has a central bore 350 in which is disposed a bushing 351 having a flange 352 received in an appropriate counterbore in the top portion of the body 60. The flipper body 60 is rotatably mounted to the top of the housing 11 by way of a bolt 355 having a stem portion 356 extending through the bore 350 in the bushing 351 and a threaded end portion 357 threaded into an appropriate threaded bore 358 in the top of the housing 11. The flipper *or slide* body 60 rests on a thrust bearing plate or platform 359 and the top of the housing 11 is recessed as shown at 361 through a limited area corresponding to the extent of angular movements of the flipper body 60, a spacer member 360 being disposed in the remaining area of the recess 361 to provide an adequate support for the flipper body.

The flipper *or slide* body 60 has an intermediate extending rib 362, as best seen in FIGURES 1 and 5, and adjacent to this rib it has cutout recessed surfaces as shown in 363 and 365, which have less extent than the intermediate rib 362. The anvil holding member 62 and the secondary hopper holding member 63 are pivotally mounted to be movable about a horizontal axis by a transverse bolt 370 which extends through appropriate transverse apertures arranged in the holding members and the rib 362 of flipper body 60. The anvil holding member 62 is normally urged downwardly by a leaf spring 371. One end of the spring 371 is attached to recessed surface 363 by means such as screw 372 and the other end of this spring is attached to the anvil 335 by a bolt or screw 373 which, as best seen in FIGURE 10, extends through a bore 374 in the holding member 62 and threads into the top of the anvil 335. Formed in the holding member 62, there is a hemispherical cavity 376 in which floats the anvil 335 which is of hemispherical shape and made of a suitable material. The bottom face 378 of the anvil is flat and is lapped to a high superfinish degree of approximately ¼ helium light band.

In operation the flat bottom face 378 of the floating anvil seeks the flatness of the die top. The mating of the anvil bottom face and the die top surface provides an absolute precise and solid fit and they are forced together in a manner as will be described presently. The cam surface 69 at the end of the holding member 62, as seen also in FIGURES 1, 5, and 10, is caused to be engaged under the end part of the arm member 67 when the flipper *or slide* is moved to a position that brings the anvil 335 over the die 58. This camming action forces the anvil bottom surface 378 down onto the die top surface as best illustrated in the enlarged view of FIGURE 10.

Figure 16:
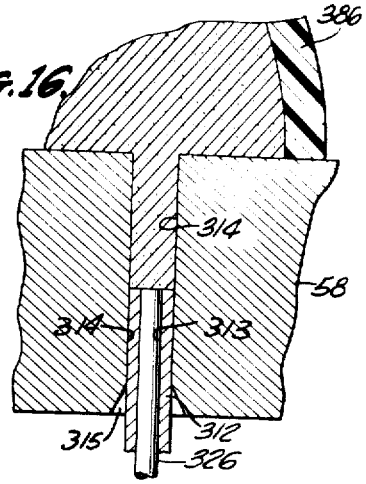
FIGURE 16 is a greatly enlarged partial sectional detail view showing the filling operation of a die cavity.

The arm holding member 63 carrying the secondary hopper is best seen in FIGURE 1 and in the enlarged view of FIGURE 9. The secondary hopper holding member 63 is also normally urged downwardly by a leaf spring 380 attached to one end by a screw 379 to the recessed surface 365 on the flipper *or slide* body 60. The other end of the leaf spring 380 is bifurcated as shown at 381 and has an upward bend as shown at 382 in FIGURE 9. The holding member 63 has a bore 385 disposed substantially vertically proximate to the end thereof, and the tube 36 which delivers the powder from the primary hopper 35 extends through this bore. The secondary hopper designated at 386 is a hollow hemisphere made of any convenient material such as, for example, tetrafluoroethylene, to the top of which the tube 36 connects as shown. In FIGURE 9, the arm of holding member 63 and the secondary hopper 386 are shown disposed directly over the die 58 for filling the die *or mold* cavities. The powder feeding down from the primary hopper into the secondary hopper 386 causes an overfill of the die cavities 314, as illustrated in FIGURE 16. Before the punch end portions 312 begin the pressing stroke compacting the powder against the anvil bottom face 378, the punches move up and expel the overfill of powder back into the secondary hopper 386. This is an important feature of the invention since the overfill and expulsion of the excess powder material before compacting assures that the die *or mold* cavities are always full when the pressing stroke begins.

As seen in FIGURES 1 and 2, and in the enlarged view of FIGURE 11 illustrating the flipper *or slide* position with the vacuum pickup head 65 positioned over the die 58 for picking up the finished formed articles, the vacuum pickup head 65 is mounted on the end of an arm or support 362 mounted on integral flipper *or slide* body 60 and disposed between the anvil holding member 62 and the secondary hopper holding member 63. The vacuum line 76 fits an appropriate bore 400 formed in arm 362 and is connected to a bore 401 provided with a counterbore 402. In the counterbore 402, there is a flexible pad 405 which can be brought down into a position over the die 58 to seal against it. This pad is provided with eight circularly arranged openings 407 corresponding to the eight die cavities or bores 314 used in the present example of the invention. Above the pad 405 and openings 407 is disposed a mesh or screen member 409. By providing this mesh or screen member, the formed finished articles such as cores, as illustrated at 336 in FIGURE 18, are picked up by the vacuum after they have been ejected from the die cavities and held against the mesh or screen member 409, as shown in phantom lines, for transfer to the delivery distributor.

Figure 12:
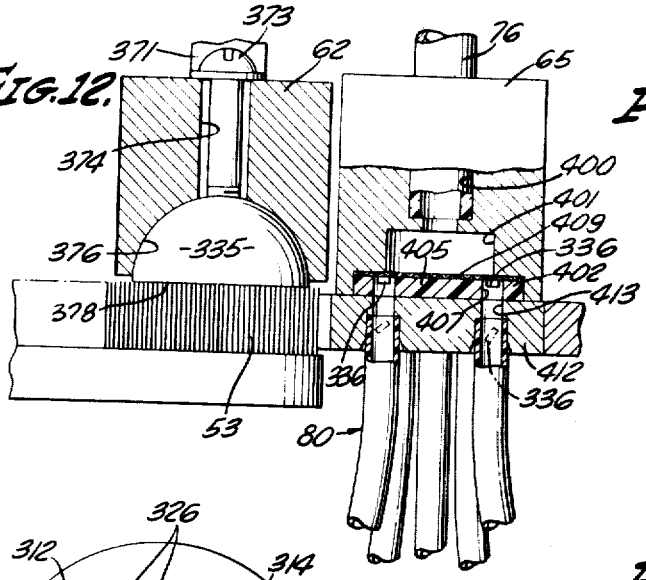
FIGURE 12 is an enlarged detail view, partly in section, of the part of the flipper carrying the anvil and the vacuum pickup.

FIGURE 12 shows the vacuum pickup head in the delivery position. It will be observed that it is in this angular position of the flipper *or slide* body 60, that the anvil holder 62 and the anvil 335 are over the rotating brush 53 which brushes any powder off the flat bottom surface 378 of the anvil 335 that may be adhering thereto. In this position the pickup head 65 is over a distributor plate 412 having eight circularly arranged openings 413 corresponding to the pattern of openings in the die. The mesh or screen member 409 and pad 405 are over the pattern of openings 413. At this time the vacuum is momentarily broken or cut off so that the vacuum head releases the formed finished articles or cores 336 which drop down through the openings 413 into the group of tubes 80 which connect to these openings and deliver the formed finished articles to a corresponding number of vials or bottles as previously described. In this position the secondary hopper 386 is over the die *or mold* cavities filling them with powder. Consequently, the die *or mold* cavities are filled, the finished articles dropped into the discharge tubes, and the anvil brushed off, all in the same position of the flipper 56.

Briefly summarizing the movements of the flipper *or slide* assembly, it will be observed that in the position in which it is shown in FIGURE 1, the vacuum pickup is over the die cavities. In the position of FIGURE 12, the finished articles are expelled, the anvil is brushed and the cavities are filled. After the overfill of powder has been expelled, the flipper *or slide* is moved to the position shown in FIGURE 11 in which the cores or finished formed articles are ejected from the die *or mold* cavities and picked up by the vacuum. The flipper then moves to transfer the picked up cores or articles to a position as shown in FIGURE 12 wherein they are discharged or delivered to the vials or bottles, the anvil is in the position to be brushed off by the brush 53 and the die *or mold* cavities are filled.

ADJUSTMENTS BEFORE OPERATION

As has been previously mentioned, among the important features of the invention is the capability of precision adjustments of the fill position of the punches *or movable die portions* and the extent of the pressing stroke whereby the powder is compacted as well as the extent of the ejecting stroke of the punches[.] *or movable die portions.* In making ferrite cores, by way of example, the dimensions of the finished articles have to be held to an accuracy within 1/10 of a thousandth of an inch in thickness resulting in machine operation adjustments capable of precise control to within at least fifty millionths of an inch.

A preferred manner of making adjustments is as follows:

The shaft 15 is rotated by way of the hand wheel 32 so that the high point of fill cam 122 is against or tangent to the cone 92. This actuates the lever mechanism 93 to position the stem 85 and the tool holder for the punches *or movable die portions* to a predetermined position. The punches can then be adjusted to the desired position, measured in thousandths of an inch or tenths of a thousandth of an inch, by adjusting the fill cam 122 along the threaded shaft 15 in the manner described above. By way of example, when the cone 92 has a one degree angle of slope, with a forty micrometer pitch thread on the shaft 15, one degree of rotation of the nuts 172 and 173 adjust the position of the fill cam 122 to produce a one millionth of an inch adjustment in the position of the punches *or movable die portions* through the lever mechanism 93. Similar adjustments may be made in the eject position of the punches *or movable die portions* by adjusting the eject cam 123. The adjustment of the eject cam may be made before the adjustment of the fill cam, if desired. The correct adjustment of the fill cam 122 for filling the die *or mold* cavities automatically takes care of the correct position or movement of the punches *or movable die portions* for the overfill. Similarly the press cam 121 is adjusted to produce the exact correct thickness of the core desired after being pressed or compressed.

By reason of these adjustments as aforesaid, the diverse positions of punch end portions 312 and core rod portions 326 can be determined with great precision so that there is always the correct, accurate amount of fill and that the cores are compacted or compressed to the exact, correct thickness. It will be observed that not only are the adjustments extremely precise, but they are very positive and dependable and maintain their accuracy during long periods of operation.

SUMMARY OF OPERATION

The adjustments described above are, of course, made before operating the machine of the invention. In operation the machine is driven by the motor 30 rotating at an appropriate substantially constant speed so as to continuously repeat the operating cycle for compacting and produring the compacted articles eight at a time, in the present example of the invention including eight cavities in the die.

For convenience, the description of the operation of the machine has been arbitrarily chosen to begin with that point in the cycle when a group of compacted finished articles have just been ejected from the die by operation of the eject cam. The eject cam 123 has a single lobe as indicated in FIGURE 15. When this lobe engages the cone 92 and operates the lever actuating mechanism 93 the stem 85 and the punch end portions 312 are moved upwardly to eject the finished articles, that is, they are moved to the position as shown in FIGURES 11 and 18 in which the finished articles are ejetced. At this time, the flipper *or slide* is angularly positioned to a position placing the vacuum pickup head 65 over the die *or mold* 58, as shown in FIGURE 18, and the source of vacuum is connected to the bore 401 in the head for lifting the finished articles against the mesh or screen member 409. The next motion in the cycle is initiated by the flipper cam 101 angularly positioning the flipper *or slide* to cause the pickup head 65 to occupy the position of FIGURE 12, with the pickup head over the discharge distributor 412. The flipper *or slide,* in this position, actuates a valve of any suitable type, not shown, to momentarily cut off the vacuum so as to release the formed finished articles to allow them to drop into the tubes 80. At this time the secondary hopper 386 is over the die in the position of FIGURE 9, and powder is allowed to flow from the primary hopper 35 into the secondary hopper so as to fill the die *or mold* cavities 314. Next in the cycle, the fill cam 122 actuates the cone 92 and the lever mechanism 93 to move the punch end portion 312 into the overfill position wherein the die *or mold* cavities are over filled and the punches *or die movable portions* are displaced to a position expelling the excess powder from the die cavities back into the secondary hopper. If toroidal cores are being formed, the core rod cam 97 operates in the manner described in the foregoing to displace the core rod end portions 326 to a position wherein their ends are flush with the top surface of the die, that is as shown in FIGURE 10. Next in the cycle, the flipper cam 101 operates the lever 280 to move the flipper *or slide* so as to position the anvil 335 over the die while moving the secondary hopper 386 away from the die. In the course of this motion, the lower edges of the secondary hopper act as wipers wiping off any loose powder from the top surface of the die. Next in the cycle, the press cam 121 comes into action and actuates the lever mechanism 93 to move the punches *or die movable portions* toward the anvil bottom surface 378 for compacting the powder filling the die cavities into the toroidal cores, as illustrated in FIGURES 10 and 17. The cores having now been formed, the flipper cam 101 now again acts to angularly shift the flipper *or slide* to move the anvil away from a position over the die, while at the same time positioning the pickup head 65 over the die, as illustrated in FIGURES 11 and 18. The eject cam 123 now operates lever mechanism 93 to further displace upwardly the punch end portions 312 to eject the formed finished articles.

From the foregoing description of an example of a machine according to the invention, those skilled in the art will observe that the invention herein achieves and realizes all of the objects and advantages as stated in the introduction, as well as having manifold additional advantages that are readily apparent from the detailed description.

The foregoing disclosure is representative of a preferred form of the invention and is to be interpreted in an illustrative rather than a limiting sense, various modifications being contemplated as may obviously be resorted to by those skilled in the art without departing from the spirit and scope of the invention, as hereinafter defined in the appended claims.

What is claimed is:

1. An actuating mechanism comprising a cam shaft having a threaded portion, a cam mounted on the cam shaft and adapted to be adjustable along the threaded portion thereof, lever means actuatable by the cam and including a member having a surface adjacent to the cam shaft and inclined at an angle to the axis of the cam shaft, said member being engageable with the cam to be actuatable thereby as the cam rotates, whereby the relative position of the lever means with respect to any angular position of the cam is adjustable by adjusting the cam along the threaded portion of the cam shaft.

2. The actuating mechanism of claim 1 wherein the cam is provided with a key engaging a longitudinal keyway in the cam shaft so as to cause said cam to be adjustably longitudinally positionable to any position along the threaded portion of said cam shaft, and an internally threaded collar member threading on the threaded portion of the cam shaft is disposed on each side of the cam for clamping said cam in any longitudinal position.

3. An actuating mechanism comprising a rotatable cam shaft, a cam mounted on said shaft for rotation thereby, said cam having a cam surface disposed at an angle relative to the axis of said cam shaft, a lever with its fulcrum axis substantially parallel to the axis of said cam shaft, a frusto-conical cam follower on one end of said lever, said cam follower having an axis substantially parallel to the cam shaft and a peripheral surface substantially parallel to the cam surface, biasing means urging the lever in a direction that causes the peripheral surface of the cam follower to engage the cam surface, and means for adjusting the relative angular position of the lever with respect to any angular position of the cam by longitudinal axial relative displacement of said cam and of said lever [fulcrum] *cam follower.*

4. The actuating mechanism of claim 3 wherein the cam shaft has a threaded portion and the cam is provided with a key engaging a longitudinal keyway in the cam shaft so as to cause said cam to be adjustably longitudinally positionable to any position along the threaded portion of said cam shaft, and an internally threaded collar member threading on the threaded portion of the cam shaft is disposed on each side of the cam for clamping said cam in any longitudinal position.

5. The actuating mechanism of claim 3 wherein a plurality of cams are engageable with the cam follower and are adjustably mounted on the cam shaft for causing the lever to be angularly displaced according to the portion of the cam surface of any one of said cams engaging said cam follower at any given angular position of the cam shaft, whereby each of said cams in succession causes said lever to effectuate a predetermined angular motion.

6. An actuating mechanism comprising a rotatable cam shaft having a threaded portion, a plurality of cams mounted on said cam shaft in a fixed angular position for rotation thereby and adapted to be longitudinally adjustable along the threaded portion thereof, each one of said cams having a cam surface disposed at an angle relative to the axis of said cam shaft, a lever having a fulcrum axis substantially parallel to the axis of the cam shaft, a bifurcated end on said lever, an elongated cam follower journaled on the bifurcated end of said lever with its axis substantially parallel to the axis of the cam shaft, said cam follower having a frusto-conical peripheral surface substantially parallel to the cam surface of the cams, and biasing means urging the lever in a direction that causes the peripheral surface of the cam follower to engage any one of the cam surfaces whereby the relative angular position of the lever with respect to any angular position of the cam shaft is adjustable by longitudinally adjusting the cams along the threaded portion of the cam shaft and the instantaneous angular position of said lever with respect to the angular position of said cam shaft is dependent upon the contour of the cam surface of the cam engaging the peripheral surface of said cam follower at any given time.

7. The actuating mechanism of claim 6 wherein each of the cams is provided with a key engaging a longitudinal keyway in the cam shaft so as to cause said cam to be adjustably longitudinally positionable to any position along the threaded portion of said cam shaft, and an internally threaded collar member threading on the threaded portion of the cam shaft is disposed on each side of each cam for clamping said cam in any longitudinal position.

References Cited

The following references, cited by the Examiner, are of record in the patented file of this patent or the original patent.

UNITED STATES PATENTS

| | | | |
|---|---|---|---|
| 678,409 | 7/1901 | Lengweiler | 74—54 |
| 2,137,081 | 11/1938 | Franke | 74—54 |
| 2,247,080 | 6/1941 | Brown | 74—568 R |
| 2,621,495 | 12/1952 | Garbarini | 74—568 R |
| 2,642,503 | 6/1953 | Dietrich | 74—568 R |

MILTON KAUFMAN, Primary Examiner

UNITED STATES PATENT OFFICE

CERTIFICATE OF CORRECTION

Patent No. Re. 27,958 Dated April 2, 1974

Inventor(s) Paul Vinson

It is certified that error appears in the above-identified patent and that said Letters Patent are hereby corrected as shown below:

Column 7, line 11, change "actutaing" to

--actuating--.

Column 9, line 3, change "intermediae" to

--intermediate--.

Signed and sealed this 17th day of September 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
* U.S. GOVERNMENT PRINTING OFFICE : 1969 O—366-334.